United States Patent
Schmitz et al.

(10) Patent No.: US 6,350,808 B1
(45) Date of Patent: Feb. 26, 2002

(54) DISPERSION POWDERS COMPRISING PARTIALLY ACETALIZED, WATER-SOLUBLE POLYVINYL ALCOHOLS, THE USE OF THESE, AND PROCESS FOR THEIR PREPARATION

(75) Inventors: Ludwig Schmitz, Buerstadt; Michael Schottler, Bischofsheim; Robert Fuss, Liederbach, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/481,663

(22) Filed: Jan. 12, 2000

(30) Foreign Application Priority Data

Jan. 15, 1999 (DE) .......................................... 199 01 307

(51) Int. Cl.⁷ ............................................ C08L 29/04
(52) U.S. Cl. ....................................................... 524/503
(58) Field of Search .................. 524/425, 503

(56) References Cited

U.S. PATENT DOCUMENTS

| | | | |
|---|---|---|---|
| 3,446,768 A | | 5/1969 | Ehmann |
| 5,429,846 A | * | 7/1995 | Sugimoto .................. 428/34.4 |
| 5,559,175 A | * | 9/1996 | Kroggel ..................... 524/297 |
| 5,567,750 A | | 10/1996 | Schulze et al. |

FOREIGN PATENT DOCUMENTS

| | | |
|---|---|---|
| DE | 936 063 | 11/1955 |
| DE | 1169 670 | 5/1967 |
| DE | 1 260 791 | 11/1971 |
| DE | 222 880 | 5/1985 |
| DE | 251 560 | 11/1987 |
| EP | 0 594 026 | 4/1994 |
| EP | 0 632 096 | 1/1995 |
| FR | 956 798 | 2/1950 |
| FR | 1 189 604 | 10/1959 |

OTHER PUBLICATIONS

Article, Fachgerechte Dämmung, Das Deutsche Malerblatt 12/96, pp. 32 ff.
Schulze, J., et al., Redispersionspulver im Zement, TIZ 9, (1985).
Schultz, G. Kunststoffdispersionen in Mineralisch Gebundenen Morteln, VDI 384, 1980, pp. 25–37.
Plastics Technologies Abstract.
Chemical Abstract, vol. 50.
Derwent Patent Family Report and/or Abstract for E. German Patent No. 222 880.
Derwent Patent Family Report and/or Abstract for E. German Patent No. 251 560.
EPO Search Report.
Translation for FR 956 798.
Translation for FR 1 189 604.

* cited by examiner

*Primary Examiner*—Paul R. Michl
(74) *Attorney, Agent, or Firm*—Anthony A. Bisulca

(57) ABSTRACT

The present invention relates to dispersion powders comprising
a) at least one base polymer from the group consisting of the vinyl ester, vinyl ester comonomer, vinyl ester/ethylene, (meth)acrylate and styrene/acrylate polymers,
b) from 1 to 25% by weight, based on the base polymer, of at least one protective colloid,
c) from 1 to 25% by weight, based on the base polymer, of at least one partially acetalized, water-soluble polyvinyl alcohol,
d) from 0 to 20% by weight, based on the total polymer weight, of anticaking agent and
e) if required, further additives,
the use of these, and process for their preparation.

12 Claims, No Drawings

DISPERSION POWDERS COMPRISING PARTIALLY ACETALIZED, WATER-SOLUBLE POLYVINYL ALCOHOLS, THE USE OF THESE, AND PROCESS FOR THEIR PREPARATION

BACKGROUND

In recent years, the heat insulation of residential buildings has become increasingly important for economic and ecological reasons. This is also clearly expressed by the more stringent heat insulation regulation (WSVO III) in force since 1995. There are two principal heat insulation systems: heat insulation renders (e.g. according to DIN 18550) and composite heat insulation systems (e.g. according to UEATc guideline and Austrian standard B6110).

Advantages of composite heat insulation systems (CHI systems) have been and are being constantly expressed in numerous publications (for example in the information brochures of the Fachverband Wärmedämm-Verbundsysteme e.V.).

The structure has essentially been established and comprises the parts consisting of insulation panel for heat insulation, adhesive for fastening the insulation panel to the substrate, reinforcing layer for compensating tension and decorative plaster for protection from weathering (cf. for example Das Deutsche Malerblatt [German Painters' Newssheet] December 1996, pp. 32 et seq.). Materials for insulation panels are primarily those based on mineral fibers or polystyrene.

The insulation panels are fastened either by means of a ready-to-process dispersion adhesive, a dispersion adhesive with added cement or a cement-bonded ready-made mortar to which dispersion powder has been added. Heat insulation panels based on polystyrene and also mineral fiber panels are generally hydrophobic. However, a cement-bonded, unmodified adhesive mortar does not adhere to such hydrophobic substrates. In order, however, to ensure sufficiently strong bonding of the CHI system, minimum tensile adhesive strengths are required in the abovementioned UEATc guideline and in Austrian standard B6110.

When such ready-made mortars are used as an adhesive and/or reinforcing layer, it is therefore essential to use dispersion powders since otherwise subsequent adhesion of the adhesive to the insulation material is not obtained. However, in this case too, the improved adhesion of the adhesive, produced by the dispersion powder, is often not sufficient to meet the requirements, in particular with respect to the tensile adhesive strengths after wet storage as required in the guidelines.

The mode of action and basic composition of dispersion powders are known and described in many publications. Only the references J. Schulze IZ 9 (1985), 3–14 and G. Schultz, VDI Berichte [VDI Reports] 384 (1980), 25–37 are mentioned here as examples.

The increase in the tensile adhesive strength also plays an important role on nonhydrophobic substrates. Thus, a polyvinyl alcohol soluble in cold water and comprising aminofunctional vinyl units is described, for example in EP-A-0 532 096, as a component of a redispersible dispersion powder which improves the tensile adhesive strength on mineral substrates, such as, for example, sidwalk slabs.

The preparation of polyvinyl acetal is known from the prior art. Usually, polyvinyl alcohol is used as a starting material and is reacted with aldehydes in aqueous solution under acid catalysis to give polyvinyl acetal. The reaction is usually carried out to complete, theoretical conversion of all hydroxyfunctionalities, with the result that the polyvinyl acetal obtained therefrom is water-insoluble and is precipitated.

EP-A-0 594 026 describes a polyvinyl acetal which is soluble or at least dispersible in water even at high degrees of acetalization, as a result of the incorporation of comonomer units carrying sulfonate groups. In addition, this publication also describes the isolation of polyvinyl acetal by freeze-drying or spray-drying. However, this dry polyvinyl acetal is not a dispersion powder in the traditional sense as described in the abovementioned citations.

The use of polyvinyl acetal as a protective colloid in emulsion polymerization is also known. Thus, DE-C-936 063 describes the acetalization of polyvinyl alcohol used as a protective colloid, during the emulsion polymerization of vinyl acetate, by addition of aldehydes and acids during the actual polymerization. Dispersions obtained therefrom are evidently distinguished by good water resistance.

DE-C-1 169 670 states that corresponding water resistance of dispersions are obtained by the use of a graft polymer comprising polyethylene glycol and vinyl acetate. In some examples, the use of partially acetalized polyvinyl alcohols is also mentioned. In contrast to DE-C-936 063, DE-C-1 260 791 describes the use of acetalized polyvinyl alcohols based on monounsaturated aldehydes. Evidently, the viscosity of the dispersions to be prepared can be influenced in the desired manner by the use of unsaturated aldehydes in direct comparison to the saturated aldehydes.

DD-A-222 880 describes the use of partially acetalized polyvinyl alcohols in emulsion polymerization. Here too, the water resistance of the films is of primary importance.

Finally, DD-A-251 560 discloses a selection of partially acetalized polyvinyl alcohols which are distinguished by a minimum surface tension of corresponding solutions.

However, it is known that acetals tend to undergo cleavage at low pH. This is also utilized in particular in chemistry involving protective groups. Since, in all examples of the abovementioned documents, either an acidic buffer having a pH of less than 4 is used during the polymerization or the use of persulfates as initiators permits a corresponding pH, as is usual in the polymerization of vinyl acetate-containing dispersions, elimination of the acetal groups is very highly probable. Consequently, it is very improbable that partially acetalized polyvinyl alcohol is still present after the end of the polymerization.

The question furthermore arises as to whether the protective colloid effect described can be achieved at all in the presence of partially acetalized polyvinyl acetal. In fact, the polymerizations always take place at temperatures of more than 60° C., in general even more than 70° C. However, partially acetalized polyvinyl alcohols have a water solubility which decreases with the increase in degree of acetalization. Thus, for example, in the case of n-butanal as aldehyde, the partially acetalized polyvinyl alcohol is precipitated from the aqueous solution already at below 60° C. or even at a very low degree of acetalization of 8.5%, which corresponds to 6.6% by weight at a 98% degree of hydrolysis of the polyvinyl alcohol used. At a theoretical degree of acetalization of 13.9% (this corresponds to 10.8% by weight at a degree of hydrolysis of 98%), the polymer is precipitated from the solution even at about 30° C.

It was the object of the present invention to develop dispersion powders which improve the tensile adhesive strength of cement-bonded ready-made mortars modified therewith, in particular after wet storage on hydrophobic substrates, in particular polystyrene.

Surprisingly, it was found that, on adding partially acetalized but still water-soluble polyvinyl alcohols to the dispersion, spraying gives dispersion powders which ensure improved wet adhesion of the ready-made mortars described above.

SUMMARY OF THE INVENTION

The present invention relates to dispersion powders comprising partially acetalized, water-soluble polyvinyl alcohols which lead to better adhesion of correspondingly modified cement-containing materials to hydrophobic substrates, the use of these, and process for their preparation.

The present invention thus relates to a dispersion powder comprising a) at least one base polymer from the group consisting of the vinyl ester, vinyl ester comonomer, vinyl ester/ethylene, (meth)acrylate and styrene/acrylate polymers, b) from 1 to 25% by weight, based on the base polymer, of at least one protective colloid, c) from 1 to 25% by weight, based on the base polymer, of at least one partially acetalized, water-soluble polyvinyl alcohol, d) from 0 to 20% by weight, based on the total polymer weight, of anticaking agent and e) if required, further additives.

DESCRIPTION OF THE PREFERRED EMBODIMENTS

A preferred dispersion powder is one which comprises a) a base polymer from the group consisting of the vinyl ester, vinyl ester comonomer, vinyl ester/ethylene, (meth)acrylate and styrene/acrylate polymers, b) from 1 to 25% by weight, based on the base polymer, of a protective colloid, c) from 1 to 25% by weight, based on the base polymer, of a partially acetalized, water-soluble polyvinyl alcohol, d) from 0 to 20% by weight, based on the total polymer weight, of anticaking agent and e) if required, further additives.

Suitable vinyl ester polymers a) are preferably vinyl acetate homopolymers or copolymers of vinyl acetate with ethylene and/or of further vinyl esters, such as vinyl propionate, vinyl pivalate, vinyl esters of ®Versatic acid 9, 10 or 11 (Shell Chemie, ∀,∀-dialkyl-branched carboxylic acids), vinyl 2-ethylhexanoate and/or esters of acrylic acid and/or methacrylic acid with straight-chain, branched or cyclic alcohols having 1 to 22 carbon atoms, in particular 1 to 12 carbon atoms.

Suitable (meth)acrylate and styrene/(meth)acrylate polymers a) are preferably polymers of styrene and/or esters of acrylic acid and/or methacrylic acid with straight-chain, branched or cyclic aliphatic alcohols having 1 to 22 carbon atoms, in particular 1 to 12 carbon atoms.

Customary protective colloids, for example cellulose ethers, water-soluble starch, polyvinylpyrrolidone and polycarboxylic acid, preferably polyvinyl alcohol, are suitable as protective colloid b).

The degree of polymerization of the polyvinyl alcohol b) is preferably in the range from 200 to 3500, particularly preferably between 500 and 3000. The degree of hydrolysis is preferably from 80 to 98 mol %, in particular from 85 to 98 mol %.

The proportion of the partially acetalized, water-soluble polyvinyl alcohols c) is preferably between 3 and 12% by weight, based on the base polymer.

The degree of acetalization of the polyvinyl alcohol c) is in the range from 1 to 20 mol %, preferably between 2 and 18 mol % and particularly preferably between 4 and 16 mol %. The degree of hydrolysis of the polyvinyl alcohol c) is in the range from 50 to 100 mol %, preferably between 70 and 100 mol % and particularly preferably between 80 and 100 mol %.

The degree of polymerization of the polyvinyl alcohol c) is preferably in the range from 200 to 3500, particularly preferably between 500 and 3000.

The proportion of anticaking agent d) is preferably between 1 and 20% by weight, based on the total polymer weight.

Suitable anticaking agents d) are preferably aluminum silicates, calcium carbonates or silicas and basic intergrowths of talc and dolomite, aluminum silicate being particularly preferred. The anticaking agent preferably has a particle size of from 0.001 to 0.5 mm.

Cement plasticizers, such as, for example, melamin/formaldehyde condensates, set-controlling additives for cement hydration, such as, for example, calcium formate or organic fruit acids, wetting agents, such as, for example, alkyl polyglycols, plasticizers, such as, for example, dibutyl phthalate, rheology modifiers, such as, for example, polycarboxylates, or dispersion antifoams, such as, for example, polyethersiloxanes, can be used as additives e).

The present invention furthermore relates to a process for the preparation of the dispersion powder according to the invention, in which a dispersion containing base polymer a), protective colloid b) and, if required, further additives is mixed with the partially acetalized, water-soluble polyvinyl alcohols, and the mixture obtained is then dried, if required with simultaneous admixing of the anticaking agent.

The addition of partially acetalized polyvinyl alcohol is effected after the end of the polymerization, preferably shortly before the spray-drying, since in this case the pH for the dispersion can be neglected. The partially acetalized polyvinyl alcohol can be present, and added to the dispersion, as a solid or as an aqueous solution, it being advantageous to add the aqueous solution in any case present as a result of the preparation process directly to the dispersion without isolating the partially acetalized polyvinyl alcohol. The preparation can be carried out in all apparatuses known for this purpose to a person skilled in the art.

Preferably, the mixture obtained is spray-dried in a drying tower. Said additives are suitably stirred into the dispersion before spraying. The spraying is effected, for example, by means of a binary nozzle or rotating disk at a temperature of the drying gas of between 100 and 180° C. To increase the shelf life and the flowability of the dispersion powder, the anticaking agent is introduced into the spray tower in a suitable amount simultaneously with the dispersion, with the result that the anticaking agent is deposited on the dispersion particles. Said processes give readily redispersible dispersion powders.

The dispersion powders according to the invention are preferably used for modifying mortars and in adhesive and reinforcing plasters for composite heat insulation systems. They lead in particular to an increase in the tensile adhesive strength and/or tensile bending strength of mortars.

The invention is described in more detail below with reference to embodiments but without being restricted thereby.

The types stated in Table 1 were synthesized and used as partially acetalized polyvinyl alcohols.

TABLE 1

| Sample | A | B | C | D |
|---|---|---|---|---|
| Aldehyde | Butanal | Butanal | 4-Hydroxy-benzaldehyde | Butanal |
| Initial degree of hydrolysis of the polyvinyl alcohol | 88% | 88% | 98% | 98% |
| Theoretical degree of acetalization | 14% | 7% | 4.9% | 13.9% |
| % by weight, based on the polyvinyl alcohol used, of aldehyde | 9.0% | 4.5% | 6.4% | 11.0% |

TABLE 1-continued

| Sample | A | B | C | D |
|---|---|---|---|---|
| Solids content of the solution | 15.9% | 15.0% | 14.9% | 15.5% |

The following dispersions were used:

Dispersion 1

Polyvinyl alcohol-stabilized vinyl acetate/ethylene copolymer dispersion having a solids content of about 58%.

Dispersion 2

Polyvinyl alcohol-stabilized vinyl acetate/vinyl versatate copolymer dispersion (vinyl versatate e.g. ®VeoVa10 from Shell) having a solids content of about 50%.

Dispersion 3

Polyvinyl alcohol-stabilized vinyl acetate/vinyl versatate/butyl acrylate terpolymer dispersion (vinyl versatate, e.g. ®VeoVa10 from Shell) having a solids content of about 53%.

Dispersion 4

Polyvinyl alcohol-stabilized methyl methacrylate/butyl acrylate copolymer dispersion having a solids content of about 50%.

Dispersion 5

Polyvinyl alcohol-stabilized vinyl acetate/dibutyl maleate copolymer dispersion having a solids content of about 50%.

Preparation of the Dispersion Powders

The preparation is described in detail with reference to dispersion powder 1, as a representative of all dispersion powders.

2.5 parts by weight, based on the base polymer of dispersion 1, of partially acetalized, water-soluble polyvinyl alcohols c) are added to the dispersion 1. If required, a spray viscosity of about 400 mPas (according to Haake, at a speed of 17.93 s$^{-1}$) is established by adding water. The mixture is sprayed with the aid of a binary nozzle. During spraying, an anticaking agent is metered in so that the proportion of the anticaking agent in the dispersion powder is 15% by weight, based on the total polymer weight. A readily flowable powder having a long shelf life is obtained.

The composition of the dispersion powders according to the invention (DP1 to DP14) and of the comparative dispersion powders (VDP1 to VDP7) is summarized in Table 2 together with the results of the testing of the performance characteristics.

In the case of the comparative examples, instead of the addition of a partially acetalized polyvinyl alcohol, the polyvinyl alcohols on which these products are based and having the corresponding degrees of hydrolysis and molecular weight are used.

Testing of Performance Characteristics

Formulation 1

For formulation 1, a base mixture having the following composition was prepared:

| Weight taken | Raw material |
|---|---|
| 1000 pbw | CEM I 42.5R |
| 1840 pbw | Quartz sand F 34 |
| 224 pbw | ® Omyacarb 130 AL |
| 572 pbw | Calcilit 0.1–0.5 |
| 176 pbw | Calcilit 0.5–1.0 |
| 8 pbw | ® Tylose MH 15.002 P6 |

Formulation 2

For formulation 2, a base mixture having the following composition was prepared:

| Weight taken | Raw material |
|---|---|
| 1400 pbw | CEM I 42.5R |
| 2412 pbw | Quartz sand ZE 23 |
| 8 pbw | ® Tylose MH 15.009 P2 |

For the determination of the tensile adhesive strengths, the tensile adhesion tester Herion HP 850 with a 3.5 kN draw piston was used.

The testing of the EPS adhesion was carried out for formulation 1 according to the UEATc guidelines of April 1992: 388 g of base mixture "formulation 1" were homogenized in the dry state in each case with 12 g of the dispersion powder to be tested, mixed manually with 80 g of water and stirred for 15 seconds at high shear rate under a Lenart stirrer. A ripening time of at least 5 minutes was maintained. A screen was placed lengthwise over the EPS panel to be coated and was coated with a part of the adhesive. The material was distributed by means of a trowel and good contact with the EPS was ensured.

The adhesive was then struck off smoothly to the thickness of the screen layer. 5 test areas were then marked off by means of a plastics ring, and the remaining adhesive was removed from the EPS. The test specimen was stored for 6 days at room temperature, and the drawbars (Ø=50 mm) were stuck on by means of epoxy resin adhesive. On the next day, 2 test stamps were drawn per adhesive mixture. The rate of increase of force was set at 10 N/s. Thereafter, the EPS panel was stored upside down in a water bath for 2 days and dried for 2 hours, and the tensile adhesive strength was determined.

The testing of the EPS adhesion was carried out for formulation 2 according to Austrian standard 6121:

382 g of base mixture "formulation 2" were homogenized in the dry state in each case with 18 g of the dispersion powder to be tested, mixed manually with 80 g of water and stirred for 15 seconds at high shear rate under a Lenart stirrer. A ripening time of at least 5 minutes was maintained. A screen was placed lengthwise over the EPS panel to be coated and was coated with a part of the adhesive. The material was distributed by means of a trowel, and good contact with the EPS was ensured.

The adhesive was then struck off smoothly to the thickness of the screen layer. 5 test areas were then marked off by means of a plastics ring, and the remaining adhesive was removed from the EPS.

The test specimens were stored for 13 days at room temperature, and the drawbars (Ø=50 mm) were stuck on by means of epoxy resin adhesive. On the next day, 2 test stamps were drawn per adhesive mixture. The rate of increase of force was set at 65 N/s. Thereafter, the EPS panel was stored upside down for 1 day in a water bath, and the tensile adhesive strength was determined.

The results are summarized in Table 2. It is clear that in all cases the dispersion powders according to the invention have better adhesion after wet storage than the corresponding comparative examples.

TABLE 2

| Powder | Dispersion | Partially acetalized polyvinyl alcohol | Amount [pbw] | Formulation 1 | | | | Formulation 2 | | | |
|---|---|---|---|---|---|---|---|---|---|---|---|
| | | | | Dry [N/mm²] | Adhering EPS in % | Wet [N/mm²] | Adhering EPS in % | Wet [N/mm²] | Adhering EPS in % | Wet [N/mm²⁺] | Adhering EPS in % |
| DP1 | 1 | D | 2.5 | 0.112 | 95 | 0.076 | 80 | 0.127 | 95 | 0.076 | 55 |
| DP2 | 1 | D | 5 | 0.155 | 95 | 0.109 | 85 | 0.153 | 95 | 0.097 | 60 |
| DP3 | 1 | D | 7.5 | 0.163 | 95 | 0.107 | 85 | 0.163 | 95 | 0.083 | 50 |
| DP4 | 1 | D | 10 | 0.163 | 95 | 0.11 | 85 | 0.125 | 95 | 0.08 | 60 |
| DP5 | 1 | B | 5 | 0.15 | 95 | 0.098 | 80 | 0.134 | 95 | 0.078 | 55 |
| DP6 | 1 | C | 3 | 0.132 | 95 | 0.124 | 80 | 0.171 | 95 | 0.073 | 45 |
| VDP1 | 1 | PVAl HG = 98% | 5 | 0.143 | 95 | 0.075 | 70 | 0.143 | 95 | <0.046 | 40 |
| VDP2 | 1 | PVAl HG = 98% | 10 | 0.138 | 95 | 0.08 | 70 | 0.155 | 95 | <0.046 | 40 |
| DP7 | 1 | A | 10 | 0.13 | 95 | 0.112 | 85 | 0.16 | 95 | 0.09 | 50 |
| VDP3 | 1 | PVAl HG = 88% | 10 | 0.13 | 95 | 0.072 | 70 | 0.153 | 95 | <0.046 | 20 |
| DP8 | 2 | D | 2.5 | 0.132 | 95 | 0.124 | 85 | 0.135 | 95 | 0.117 | 80 |
| DP9 | 2 | D | 5 | 0.132 | 95 | 0.115 | 85 | 0.135 | 95 | 0.09 | 60 |
| VDP4 | 2 | PVAl HG = 88% | 2.5 | 0.12 | 95 | 0.09 | 75 | 0.158 | 95 | 0.078 | 40 |
| DP10 | 3 | A | 2.5 | 0.143 | 95 | 0.083 | 70 | 0.15 | 95 | 0.081 | 40 |
| DP11 | 3 | A | 5 | 0.13 | 95 | 0.095 | 75 | 0.16 | 95 | 0.078 | 40 |
| DP12 | 3 | A | 10 | 0.13 | 95 | 0.1 | 75 | 0.143 | 95 | 0.087 | 45 |
| VDP5 | 3 | PVAl HG = 88% | 5 | 0.158 | 95 | 0.065 | 30 | 0.13 | 95 | 0.058 | 25 |
| DP13 | 4 | D | 5 | 0.094 | 65 | 0.061 | 60 | 0.14 | 95 | 0.06 | 40 |
| VDP6 | 4 | PVAl HG = 98% | 5 | 0.177 | 90 | 0.056 | 40 | 0.148 | 95 | <0.046 | 30 |
| DP14 | 5 | D | 5 | 0.061 | 50 | 0.059 | 15 | 0.066 | 40 | 0.051 | 15 |
| VDP7 | 5 | — | 0 | <0.046 | 10 | <0.046 | 10 | <0.046 | 10 | <0.046 | 10 |

What is claimed is:

1. A dispersion powder comprising
   a) at least one base polymer from the group consisting of the vinyl ester, vinyl ester comonomer, vinyl ester/ethylene, (meth)acrylate and styrene/acrylate polymers,
   b) from 1 to 25% by weight, based on the base polymer, of at least one protective colloid,
   c) from 1 to 25% by weight, based on the base polymer, of at least one partially acetalized, water-soluble polyvinyl alcohol,
   d) from 0 to 20% by weight, based on the total polymer weight, of anticaking agent and
   e) if required, further additives.

2. The dispersion powder as claimed in claim 1, wherein the polymer a) is vinyl acetate copolymer.

3. The dispersion powder as claimed in claim 1, wherein the protective colloid b) is polyvinyl alcohol.

4. The dispersion powder as claimed in claim 3, wherein the polyvinyl alcohol b) has a degree of polymerization of from 200 to 3500 and a degree of hydrolysis of from 80 to 98 mol %.

5. The dispersion powder as claimed in claim 1, wherein the proportion of the partially acetalized, water-soluble polyvinyl alcohols c) is in the range from 3 to 12% by weight, based on the base polymer.

6. The dispersion powder as claimed in claim 1, wherein the partially acetalized, water-soluble polyvinyl alcohol has a degree of acetalization of from 1 to 20 mol % and a degree of hydrolysis of from 50 to 100 mol %.

7. The dispersion powder as claimed in claim 1, wherein from 1 to 20% by weight, based on the total mass of the polymer, of anticaking agent d) is present.

8. A process for the preparation of a dispersion powder as claimed in claim 1, in which a dispersion containing base polymer a), protective colloid b) and, optionally, further additives is mixed with the partially acetalized, water-soluble polyvinyl alcohols, and the mixture obtained is then dried, optionally with simultaneous admixing of the anticaking agent.

9. The process as claimed in claim 8, wherein the mixture obtained is spray-dried in a drying tower.

10. A method of modifying mortars, comprising the step of adding a dispersion powder as claimed in claim 1 to said mortar to be modified.

11. The method as claimed in claim 10, wherein the modification means an increase of the tensile adhesive strength of mortars, of the tensile bending strength of mortars, or of both.

12. A method of preparing adhesive and reinforcing plasters for composite heat insulation systems, comprising the step of adding a dispersion powder as claimed in claim 1 to a plaster material.

* * * * *